US012040650B2

(12) United States Patent
Xu et al.

(10) Patent No.: US 12,040,650 B2
(45) Date of Patent: Jul. 16, 2024

(54) SYSTEMS AND METHODS FOR EFFICIENT CHARGING OF ENERGY STORAGE SYSTEMS

(71) Applicant: BluWave Inc., Ottawa (CA)

(72) Inventors: Yujie Xu, Ottawa (CA); Mostafa Farrokhabadi, Ottawa (CA)

(73) Assignee: BluWave Inc., Ottawa (CA)

( * ) Notice: Subject to any disclaimer, the term of this patent is extended or adjusted under 35 U.S.C. 154(b) by 747 days.

(21) Appl. No.: 17/039,015

(22) Filed: Sep. 30, 2020

(65) Prior Publication Data

US 2022/0102998 A1 Mar. 31, 2022

(51) Int. Cl.
*H02J 7/02* (2016.01)
*H02J 7/00* (2006.01)

(52) U.S. Cl.
CPC ........ *H02J 7/0071* (2020.01); *H02J 7/00032* (2020.01); *H02J 7/0014* (2013.01)

(58) Field of Classification Search
CPC ..................................................... H02J 7/0071
USPC ......................................................... 320/125
See application file for complete search history.

(56) References Cited

U.S. PATENT DOCUMENTS

| 10,734,811 | B2* | 8/2020 | Doherty | .................. | H02J 3/003 |
| 2019/0074709 | A1* | 3/2019 | Homma | .................. | H02J 3/466 |
| 2019/0165580 | A1* | 5/2019 | Doherty | ............... | G05B 13/042 |
| 2020/0005208 | A1* | 1/2020 | Fife | ......................... | H02J 13/00 |

FOREIGN PATENT DOCUMENTS

EP 2698896 A2 * 2/2014 ............. G08B 21/18

OTHER PUBLICATIONS

Liang et al., "State-of-charge Balancing Control for Battery Energy Stored Quasi-z Source Cascaded Multilevel Inverter Based Photovoltaic Power System," IEEE Energy Conversion Congress and Exposition, 2015, pp. 8-13.
Narimani et al., "Energy Storage Control Methods for Demand Charge Reduction and Pv Utilization Improvement," IEEE PES Asia-pacific Power and Energy Engineering Conference, Bangalore, 2017, pp. 1-5.

(Continued)

*Primary Examiner* — Yalkew Fantu
(74) *Attorney, Agent, or Firm* — Borden Ladner Gervais LLP

(57) ABSTRACT

Systems and methods for dynamically charging energy storage devices connected to a power grid or other power system are provided. Charging decisions for charging the energy storage devices may be optimized, for example by basing the decisions on historical data, to provide more efficient or effective charging and use of power. The historical data may include an amount of energy previously discharged by each of the energy storage devices, a previous charging decision for each of the devices, a previous total fixed load power request of the power grid, and/or a pervious amount of power received by the power grid, which may include power received from intermittent power sources. In some aspects, the present techniques do not require current system state information or explicit predictions of future intermittent power availability. In some aspects, charging decisions are based on a solution to an online optimization problem.

20 Claims, 5 Drawing Sheets

(56) References Cited

OTHER PUBLICATIONS

Rahbar et al., "Shared Energy Storage Management for Renewable Energy Integration in Smart Grid," 2016 IEEE Power & Energy Society Innovative Smart Grid Technologies Conference, 2016, pp. 1-5.
Shu et al., "Optimal Operation Strategy of Energy Storage System for Grid-Connected Wind Power Plants," IEEE Transactions on Sustainable Energy, Jan. 2014, vol. 5(1), pp. 190-199.
Singh et al., "A Design Scheme of Control Optimization System for Hybrid Solar-Wind and Battery Energy Storages System," IEEE 51st International Universities Power Engineering Conference, 2016, pp. 1-6.
Tomasson et al., "Optimal Offer-Bid Strategy of an Energy Storage Portfolio: A Linear Quasi-Relaxation Approach," IEEE Transactions on Smart Grid, 2019, pp. 1-8.
Wong et al., "Capturing Wind With Thermal Energy Storage-Summerside's Smart Grid Approach," IEEE Power and Energy Technology Systems Journal, Dec. 2017, vol. 4(4), pp. 115-124.
YU and Neely., "A Low Complexity Algorithm with O(T) Regret and O(1) Constraint Violations for Online Convex Optimization with Long Term Constraints," Journal of Machine Learning Research, Feb. 2020, vol. 21(1), pp. 1-24.

* cited by examiner

SYSTEMS AND METHODS FOR EFFICIENT CHARGING OF ENERGY STORAGE SYSTEMS

FIELD

The present disclosure relates generally to energy storage systems, and more particularly to charging management of energy storage systems.

BACKGROUND

In a power grid system, the operator usually needs to decide the amount of imported power from an upper grid to satisfy future power requirement. This is often done in blocks of time, for example in next hour. This imported power may be referred to as "scheduled imported power". Due to the time varying nature of load and renewable energy, the prediction of the net demand (defined as the difference between load and renewable energy) may be not accurate, and therefore the scheduled imported power may be significantly larger or less than the actual net demand. The consequence is that the operator will be penalized for deviating from the pre-determined "scheduled power" to meet the actual net demand. The penalty may be in the form of a monetary charge for requesting additional power on demand. Similarly, if too much power is scheduled, then the operator may have to sell the power back to the grid at a loss, or perhaps dump the power to ground.

FIG. 1 is an example graph showing fluctuating net power demand $P_N$ in an electrical power grid, and scheduled imported power $P_{Sch}$ into the grid. In the first interval, $P_N < P_{Sch}$, and the grid operator will get penalized financially for exporting power $P_{Sch} - P_N$ since the price of sending energy back to the upper grid is usually much cheaper than that of buying energy from the upper grid. In the second interval, we observe that $P_N > P_{Sch}$, and the grid operator will get penalized for importing extra power $P_N - P_{Sch}$ to meet the actual net demand.

In some power grids and other power systems, electrical energy is stored in energy storage systems or devices for later use. For instance, energy may be stored when energy can be purchased at a lower rate, when there is an oversupply of energy, and/or when demand is low. When there is an oversupply of energy, storing surplus energy may be done instead of sending the energy to an upper grid. Further, energy storage systems are useful for storing energy from intermittent power plants, sometimes called variable power plants, such as renewable sources, including solar, wind, or tidal power. In an intermittent power plant, power is not always dispatchable due the fluctuating nature of the energy source. The stored energy may be used at a later time, for example to reduce the amount of power imported from the upper grid, or to handle an unexpected increase in net demand. An unexpected increase in demand can occur, for instance, due to inaccurate demand forecasting. Also, using power stored in energy storage systems to satisfy some power demand may sometimes be cheaper than buying power from the upper grid.

There are many challenges in energy storage management. For instance, a grid operator may make inefficient decisions by charging the energy storage when $P_N > P_{Sch}$. In such a case, the operator needs to import more energy than $P_N - P_{Sch}$, which typically results in cost penalties, for example having to pay a premium rate for the additional energy.

Accordingly, improvements relating to energy storage system management are desired.

The above information is presented as background information only to assist with an understanding of the present disclosure. No assertion or admission is made as to whether any of the above, or anything else in the present disclosure, unless explicitly stated, might be applicable as prior art with regard to the present disclosure.

BRIEF DESCRIPTION OF THE DRAWINGS

Embodiments of the present disclosure will now be described, by way of example only, with reference to the attached Figures.

Figure 1:
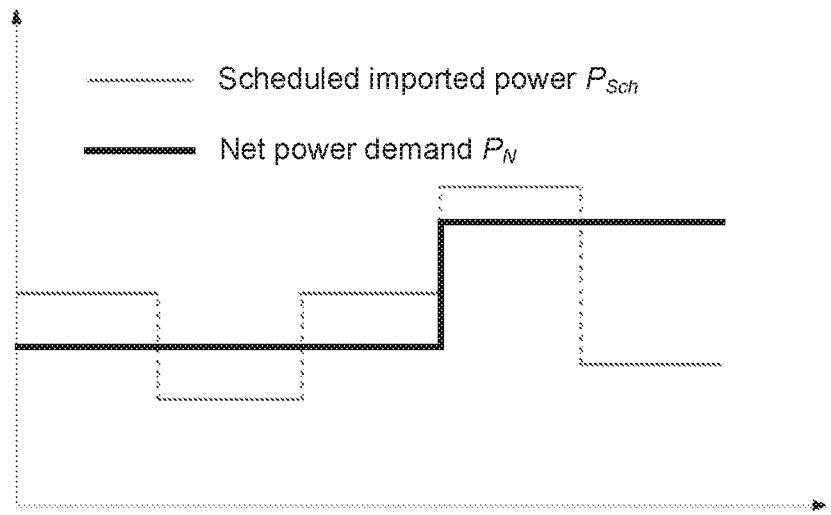
FIG. 1 is an example graph showing fluctuating net power demand and scheduled imported power in an electrical power grid.

The relative sizes and relative positions of elements in the drawings are not necessarily drawn to scale. For example, the shapes of various elements and angles are not necessarily drawn to scale, and some of these elements may be arbitrarily enlarged and/or positioned to improve the readability of the drawings. Further, the particular shapes of the elements as drawn are not necessarily intended to convey any information regarding the actual shape of the particular elements, and have been solely selected for ease of recognition in the drawings.

DETAILED DESCRIPTION

The present disclosure generally relates to improvements in energy storage management. In particular, the present disclosure relates to optimized energy storage device charging techniques.

In an aspect, the present disclosure relates to improvements in energy storage systems charging technology. Improved charging technology may include making more efficient or effective decisions on how to charge energy storage devices in a power grid or power system.

In an aspect, the decisions of if, when and how to charge energy storage devices used in conjunction with a power grid, or other power system, may be done dynamically to provide a more efficient system. These charging decisions may be based on historical data and information rather than, for example, on predictions. In an aspect, the historical information may comprise data from one or more previous time periods. In an aspect, historical information may information from a previous time slot, such as one or more of: the amount of energy discharged by each energy storage device, the charging decision for each of the devices, a total fixed load power request of the power grid, and/or an amount of power received by the power grid. The amount of power received by the power grid may include an amount of power received by the power grid in a previous time period from one or more intermittent power sources.

In an aspect, the present disclosure provides a dynamic optimization approach to energy storage charging, which sets one or more soft charging conditions. This approach may allow for charging in a broader range of circumstances, for example, when there is surplus power in on-peak hours in a power grid. Further, this type of approach may better utilize energy storage devices to reduce the negative effects of inaccurately scheduling imported power into a power grid, meaning that the amount of scheduled imported power is higher or lower than the actual demand. Negative effects can include economic and/or environmental effects. Economic effects can the penalties may for requesting additional power (e.g. to the scheduled power) on demand to satisfy demand, or having to sell surplus power back to the grid at a loss. An environmental effect can be the dumping surplus power to ground.

Accordingly, the present disclosure provides improved ways to handle surplus power by charging energy storage devices that may mitigate or eliminate some of these economic and/or environment effects.

In contrast to the present disclosure, some prior techniques are rule-based schemes and have some hard charging conditions. For example, some prior approaches charge the energy storage only in off-peak hours and when the charging time is sufficiently long. Other prior approaches use a rule-based charging scheme based on the state of charge of the energy storage. State of charge (SoC) refers to the level of charge of an energy storage device relative to its overall energy storage capacity. These prior approaches are strict and thus are more likely to be less accurate and less efficient than the approaches according to the present disclosure.

Further, some prior techniques assume that state information of the energy storage devices is almost instantaneously available to an energy storage controller. For instance, some assume that a communication delay of state information the energy storage device to the energy storage controller is negligible. Some prior techniques assume that instantaneous state of charge and charging dispatch are available. Other prior techniques have a charging scheme that assumes that instantaneous system state information is known at the time a charging decision is made, for example the fixed load and/or renewable power for a next time period. However, this information is often not known when the charging decision is made, and further, there is usually some communication delay in receiving this information at the controller. Some prior techniques assume that a transition probability is known when the charging decision is made, where transition probability is the probability that the system transfers from one state to another state.

However, in practice, these types of communications delays, delays in obtaining charge or other state information, and/or charging dispatch delays may have a significant impact on the performance of the charging management system. A charging dispatch delay relates to the time it takes between when a controller sends a charging command to an energy storage device, and when the energy storage device actually starts charging. In an aspect, the methods and systems according to the present disclosure may account for and/or overcome these types of delays, for example by basing decisions on historical information rather than attempting to use real-time or near real-time information, which may or may not be available when charging decisions are being made. For instance, historical information may comprise information and/or data from one or more previous time periods or time slots. In such a way, issues that arise in practice due to the above noted delays may be mitigated or eliminated according to the present disclosure by not requiring instantaneous or current state information for the charging management. Moreover, aspects according to the present disclosure do not make or use any explicit predictions, for example of an amount of renewable power that will be available to a grid in a next time slot.

The present disclosure provides, in an aspect, methods and systems according to the following. In an embodiment, an energy storage controller receives energy discharge information of an energy storage system, which has one or more energy storage devices. The energy discharge information generally relates to an amount of energy discharged by each of the energy storage devices in a previous time period or slot. The controller determines a charging parameter for each of the energy storage devices, for example charging power, for charging each of the energy storage devices in a current time period. This determining of the charging parameters may be based on historical information, for instance information from one or more previous time periods. Historical information may include the energy discharge information, and/or a charging decision for each of the energy storage device for the previous time period. The controller then generates a charging decision for the energy storage device for the current time period based on the determined charging parameter. The charging decision may be, for example, the charging power at which the energy storage device will be charged during the current time period. The charging decisions for each of the one or more energy storage devices may then be provided to a power grid or system so that the energy storage devices may be charged in the current time period based on the charging decisions.

The determining of the charging parameters based on the historical information can make the charging decision(s) dynamically adaptable to an evolving environment of the system.

According to an aspect, the present disclosure is directed to a computer-implemented method comprising receiving energy discharge information of an energy storage system, the energy storage system comprising an energy storage device, the energy discharge information relating to an amount of energy discharged by the energy storage device in a previous time period, determining a charging parameter for charging the energy storage device in a current time period, wherein the determining is based at least on historical information comprising the energy discharge information, a charging decision for the energy storage device for the previous time period, a total fixed load power request of the power system in the previous time period, and an amount of power received by the power system in the previous time period, generating a charging decision for the energy storage device for the current time period, the charging decision being based on the determined charging parameter, and providing the charging decision to a power system to enable the power system to charge the energy storage device in the current time period based on the charging decision.

In an embodiment, the charging parameter is a charging power level.

In an embodiment, the generating a charging decision for the energy storage device for the current time period further comprises determining if an energy level of the energy storage device is below a first threshold value, and setting, in response to the energy level being below the first threshold value, the charging decision to indicate that the energy storage device is to be charged at a maximum charging power in the current time period.

In an embodiment, the generating a charging decision for the energy storage device for the current time period further comprises determining if an energy level of the energy storage device is above a second threshold value, and setting, in response to the energy level being above the second threshold value, the charging decision to indicate that the energy storage device is to be charged at a minimum charging power in the current time period.

In an embodiment, the determining a charging parameter for the energy storage device for a current time period is based on solving an online optimization problem, and wherein at least some of the historical information are input parameters to the optimization problem.

In an embodiment, an optimization function of the online optimization problem is represented at least partially by $$\min_{\{P_i^{ch}(t)\}} \sum_i sP_i^{ch}(t) + VQ_i(t-1)P_i^{ch}(t) + \lambda(P_i^{ch}(t) - P_i^{ch}(t-1))^2$$

$$0 \le P_i^{ch}(t) \le P_i^{ch,max}$$

$$\text{s.t.} \sum_i P_i^{ch}(t) \le P^{ch,max}$$

$$\text{where } s = 2\left(\sum_i P_i^{ch}(t-1) + P_L^{NT}(t-1) - P_{Sch}(t-1) - P_R(t-1)\right), P_i^{ch}(t)$$

is a charging power in the current time period for energy storage device i, $P_i^{ch}(t-1)$ is a charging power in the previous time period for energy storage device i, $Q_i(t-1)$ is a value of an auxiliary variable(s) in the previous time period, $P_i^{ch,max}$ is a maximum charging power for energy storage device i, $P^{ch,max}$ is a maximum charging power for all energy storage devices, and V, $\lambda$ are hyper-parameters.

In an embodiment, the historical information comprising an amount of power received by the power system in the previous time period includes an amount of power received by the power system from one or more intermittent power sources in the previous time period.

In an embodiment, the energy storage system comprises a plurality of energy storage devices, and wherein the energy discharge information relates to an amount of energy discharged by each of the plurality of energy storage devices in a previous time period, and wherein the determining, the generating, and the providing is performed in relation to each of the plurality of energy storage devices.

According to an aspect, the present disclosure is directed to a computer-implemented system, comprising a processor, and a memory operatively connected to the processor, and storing instructions for the processor, wherein the processor is configured to perform operations comprising receive energy discharge information of an energy storage system, the energy storage system comprising an energy storage device, the energy discharge information relating to an amount of energy discharged by the energy storage device in a previous time period, determine a charging parameter for charging the energy storage device in a current time period, wherein the determining is based at least on historical information comprising the energy discharge information, a charging decision for the energy storage device for the previous time period, a total fixed load power request of the power system in the previous time period, and an amount of power received by the power system in the previous period, generate a charging decision for the energy storage device for the current time period, the charging decision being based on the determined charging parameter, and provide the charging decision to a power system to enable the power system to charge the energy storage device in the current time period based on the charging decision.

In an embodiment, the charging parameter is a charging power level.

In an embodiment, in relation to the generating a charging decision, the processor is further configured to determine if an energy level of the energy storage device is below a first threshold value, and set, in response to the energy level being below the first threshold value, the charging decision to indicate that the energy storage device is to be charged at a maximum charging power in the current time period.

In an embodiment, in relation to the generating a charging decision, the processor is further configured to determine if an energy level of the energy storage device is above a second threshold value, and set, in response to the energy level being above the second threshold value, the charging decision to indicate that the energy storage device is to be charged at a minimum charging power in the current time period.

In an embodiment, the processor is further configured to determine the charging parameter for the energy storage device based on solving an online optimization problem, and wherein at least some of the historical information are input parameters to the optimization problem.

In an embodiment, an optimization function of the online optimization problem is represented at least partially by $$\min_{\{P_i^{ch}(t)\}} \sum_i sP_i^{ch}(t) + VQ_i(t-1)P_i^{ch}(t) + \lambda(P_i^{ch}(t) - P_i^{ch}(t-1))^2$$

$$0 \le P_i^{ch}(t) \le P_i^{ch,max}$$

$$\text{s.t.} \sum_i P_i^{ch}(t) \le P^{ch,max}$$

$$\text{where } s = 2\left(\sum_i P_i^{ch}(t-1) + P_L^{NT}(t-1) - P_{Sch}(t-1) - P_R(t-1)\right), P_i^{ch}(t)$$

is a charging power in the current time period for energy storage device i, $P_i^{ch}(t-1)$ is a charging power in the previous time period for energy storage device i, $Q_i(t-1)$ is a value of an auxiliary variable(s) in the previous time period, $P_i^{ch,max}$ is a maximum charging power for energy storage device i, $P^{ch,max}$ is a maximum charging power for all energy storage devices, and V, $\lambda$ are hyper-parameters.

In an embodiment, the historical information comprising an amount of power received by the power system in the previous time period includes an amount of power received by the power system from one or more intermittent power sources in the previous time period.

According to an aspect, the present disclosure is directed to a non-transitory computer-readable medium having computer-readable instructions stored thereon, the computer-readable instructions executable by a processor of one or more electronic devices to cause the performance of operations comprising receiving energy discharge information of an energy storage system, the energy storage system comprising an energy storage device, the energy discharge information relating to an amount of energy discharged by the energy storage device in a previous time period, determining a charging parameter for charging the energy storage device in a current time period, wherein the determining is based at least on historical information comprising the energy discharge information, a charging decision for the energy storage device for the previous time period, a total fixed load power request of the power system in the previous time period, and an amount of power received by the power system in the previous time period, generating a charging decision for the energy storage device for the current time period, the charging decision being based on the determined charging parameter, and providing the charging decision to a power system to enable the power system to charge the energy storage device in the current time period based on the charging decision.

In an embodiment, the charging parameter is a charging power level.

In an embodiment, the generating a charging decision for the energy storage device for the current time period further comprises determining if an energy level of the energy storage device is below a first threshold value and/or determining if the energy level of the energy storage device is above a second threshold value, the second threshold value being higher than the first threshold value, and setting, in response to the energy level being below the first threshold value, the charging decision to indicate that the energy storage device is to be charged at a maximum charging power in the current time period, and in response to the energy level being above the second threshold value, the charging decision to indicate that the energy storage device is to be charged at a minimum charging power in the current time period.

In an embodiment, the determining a charging parameter for the energy storage device for a current time period is based on solving an online optimization problem, and wherein at least some of the historical information are input parameters to the optimization problem.

In an embodiment, an optimization function of the online optimization problem is represented at least partially by $$\min_{\{P_i^{ch}(t)\}} \sum_i sP_i^{ch}(t) + VQ_i(t-1)P_i^{ch}(t) + \lambda(P_i^{ch}(t) - P_i^{ch}(t-1))^2$$

$$0 \le P_i^{ch}(t) \le P_i^{ch,max}$$

$$\text{s.t.} \sum_i P_i^{ch}(t) \le P^{ch,max}$$

where $s = 2\left(\sum_i P_i^{ch}(t-1) + P_L^{NT}(t-1) - P_{Sch}(t-1) - P_R(t-1)\right), P_i^{ch}(t)$ is a charging power in the current time period for energy storage device i, $P_i^{ch}(t-1)$ is a charging power in the previous time period for energy storage device i, $Q_i(t-1)$ is a value of an auxiliary variable(s) in the previous time period, $P_i^{ch,max}$ is a maximum charging power for energy storage device i, $P^{ch,max}$ is a maximum charging power for all energy storage devices, and V, λ are hyper-parameters.

Aspects and advantages according to the present disclosure will be apparent from the following, taken in conjunction with the accompanying drawings, wherein are set forth, by way of illustration and example only, certain embodiments according to the present disclosure.

For descriptive purposes, several aspects, embodiments, and features according to the present disclosure are described in relation to power grids. However, this is not intended to be limiting. The teachings according to the present disclosure may be applied to fields and technologies other than power grids, including but not limited to other power systems. Some examples of other applications are small-scale community power scheduling, electrical vehicle charging, and water heater charging.

The present disclosure describes embodiments which may be implemented in multiple energy storage devices, controllers and power grids able to perform power scheduling and exchange information. The energy storage devices can store energy in any suitable form(s), such as electricity, heat, electrical potential, or chemical.

Further, the generic term "grid" is used herein. This term refers to any kind of suitable power plant. Also, the generic term "controller" is used, which may be any kind of suitable device or system capable of performing control operations, which may include calculations and/or signaling between a grid and an energy storage device(s). A controller may be an entity inside the grid.

Further, the term "energy storage device" is also herein. This term generally refers to any suitable type(s) of device or unit that can store energy in any suitable form(s), such as electricity, heat, electrical potential, chemical, thermal, or elastic.

Figure 2:
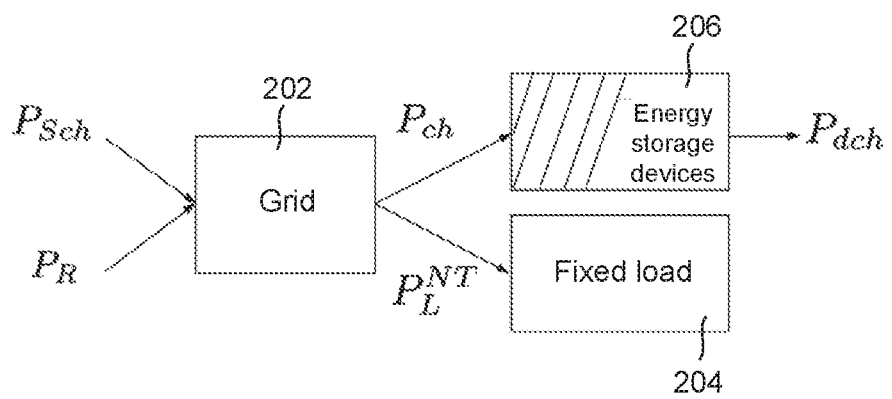
FIG. 2 is a diagram representing an example system with associated power flow between a power system, a fixed load, and energy storage device(s).

FIG. 2 is a diagram representing an example system with associated power flow between power grid 202, fixed load 204, and energy storage device(s) 206. Fixed load 204 generally refers to the total power being removed by users of power grid 202. This load is fixed in the sense that it is not controllable by a charging controller in the way that a charging load, meaning power used to charge energy storage device(s) 206, may be controlled by the controller. In other words, the controller has an ability to control the amount of power that is used to charge the energy storage device(s) 206, while the controller cannot control the power demand by the users of the grid. Decisions on if and how to charge energy storage devices may be made on a time-slot by time-slot basis. Sometimes the term time period is used in place of time slot. A length of time slots may be of any suitable value. The length may depend on, for example, the type of system. In some embodiments, performance may often be better with shorter time slots.

Time slot indexes may be denoted by Γ={1, 2, ..., T, ...}. The duration of each time slot is fixed and denoted by Δt. At the beginning of time slot t, a charging decision for charging an energy storage device may be made. When there are multiple energy storage devices, then a charging decision may be made for each device. $P_{Sch}(t)$ is the scheduled power in time slot t, meaning the amount of power that is scheduled to be imported to the grid, for example from an upper grid. $P_R(t)$ is the actual additional power imported to the grid in time slot t, for example from an intermittent power plant, such as a renewable energy source(s). For simplicity, this additional power may be referred to hereinafter as renewable energy or renewable power, however this is not meant to be limiting. The terms renewable power and renewable energy is intended to include types of power other than renewable power that may be supplied to a grid other than the usual, continuous power. $P_R(t)$ may be highly variable over time. $P_L^{NT}(t)$ is the power request for the total fixed load, meaning the total power used by the load(s) during the time slot. In existing power grids, this load request must typically be satisfied in time slot t.

In this example, there are N energy storage devices. The charging and discharging power for energy storage device i are $P_i^{ch}(t)$ and $P_i^{dch}(t)$, respectively, for 1≤i≤N. A maximum charging power at which energy storage device i can be charged in a time slot is $P_i^{ch,max}$, while a maximum aggregate charging power for all energy storage devices in a time slot is $P^{ch,max}$. Charging power and discharging power generally refer to the power level at which an energy storage device is charged or discharged, respectively, for example during a time slot. As such, charging power may also be referred to as charging power level. A maximum charging power of a device may be, for example, a maximum charging power specified by the manufacturer of the device. A maximum aggregate charging power for all energy storage devices refers to a total maximum charging power that the grid will provide for charging the energy storage devices.

Accordingly, FIG. 2 shows inputs to grid 202 comprising scheduled power in time slot t, $P_{Sch}(t)$, and actual renewable power imported to the grid in time slot t, $P_R(t)$. Outputs from grid 200 comprise power to service the total fixed load 204, $P_L^{NT}$, and the charging power for energy storage devices 206 for i=1 to N, $P_{ch}$. Thus, any renewable power $P_R$ that is available and imported to grid 202 during time slot t may be used to help satisfy the fixed load 204 demand.

To determine a scheduled power in time slot t, $P_{Sch}(t)$, to request from another source, such as an upper grid, the demand of fixed load 204 and renewable power $P_R$ may be estimated for time slot t. However, the estimations are typically not perfect, and in these cases there will be positive or negative net differences. Examples of this were shown and described with reference to FIG. 1. Accordingly, to account at least in part for these differences, energy storage devices 206 may be used. For example, when more power is scheduled than is need to satisfy fixed load 204, the excess power may be used to charge energy storage devices 206. Contrarily, when less power is scheduled than is needed to satisfy the demand of fixed load 204, energy stored in charge energy storage devices 206 may be used to at least partly satisfy the demand that cannot be satisfied by the scheduled power $P_{Sch}$.

Systems, methods, and techniques relating to the charging of energy storage devices according to the present disclosure are now described.

Figure 3:
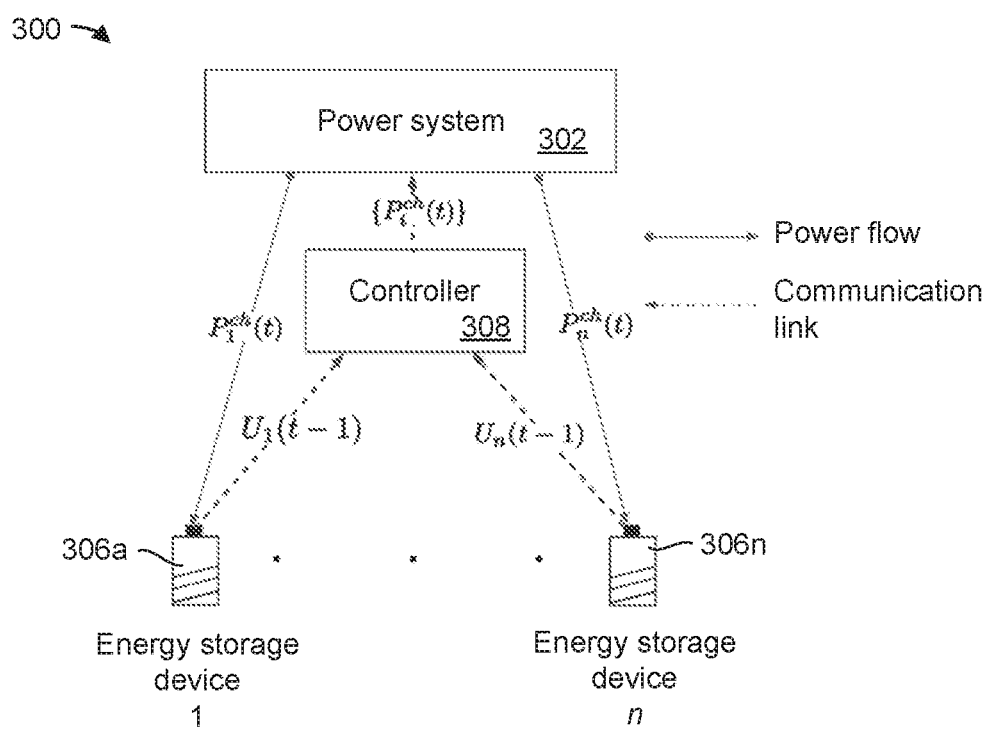
FIG. 3 is a diagram of an example system architecture having a power system, a number of energy storage devices, and an energy storage management controller.

FIG. 3 is a diagram of an example system architecture 300 comprising a power system 302, for example a power grid, any number of energy storage devices 306a-306n (e.g. n=1, 2, 3, 4, etc.), and an energy storage management controller 308. Energy storage management controller 308 may be implemented in any suitable way, for example it may be implemented on or using one or more computing devices having one or more processors. Further, controller 308 may be implemented in software, hardware, firmware, in any combination thereof, or in any other suitable manner. The dashed lines represent possible data communication links, and the solid lines represent possible power flows. The communications links and power flows may be direct or indirect, meaning there may be one or more other entities between start and end points in the communications and/or power flows.

The number of grids, energy storage devices, and controllers shown and described is merely an example. In other embodiments, there may be additional controllers and/or grids, and/or fewer energy storage devices.

In system 300, at or around time t, energy discharge information relating to each of one or more of charging energy storage devices 306a-306n from a previous time period or time slot may be provided or otherwise made available to controller 308. The energy discharge information may include the amount of energy discharged by each of charging energy storage devices 306a-306n in previous time slot t−1, namely $U_i(t-1)$.

In terms of using historical information according to the present disclosure, in some embodiments, information from one or more other previous time slots, such as t−2, t−3, etc. may be used. Further, in an embodiment, information from two or more previous time slots may be used.

Controller 308 may determine one or more charging parameters for each of the energy storage devices 306a-306n for charging energy storage devices 306a-306n in a current time period, such as time slot t. The one or more parameters may be any suitable type of parameter relating to charging or otherwise. An example parameter is charging power, meaning the power at which an energy storage device is to be charged during a time slot. The determining may be performed based at least on historical information. The historical information may include any suitable type of information. In an embodiment, the historical information may include one or more of: the energy discharge information for each of devices 306a-306n for a previous time slot, a charging decision for each of devices 306a-306n for a previous time slot, a total fixed load power request of the power grid in a previous time slot, and an amount of power received by the power grid from intermittent power plant source(s) in the previous time slot.

Determining a parameter or decision for a current time period may refer to making the determination for the next time period. For example, determining a parameter or decision for the next time period may be done in the previous time period, for instance towards the end of the previous time period. For instance, a charging decision for time slot t may be determined towards the end of time slot t−1. Accordingly, determining a parameter or decision for a current time period does not mean that the determining is performed in the current time period.

The term charging decision refers to a decision relating to the charging of an energy storage device that is actually to be implemented. In contrast, a charging parameter refers to information relating to charging the energy storage device. However, a charging decision may be based on one or more charging parameters, but the charging decision does not necessarily consist only of, or match, the charging parameter. In an example to illustrate the difference, a charging parameter in the form of charging power level may be determined for an energy storage device to be 5 MW. However, a charging decision may be made, subsequently for example, to charge the energy storage device at 7 MW. This may be done, for instance, if the state of charge of the energy storage device was very low and required rapid replenishing.

Turning back now to the example of FIG. 3, controller 308 determines a charging parameter in the form of a charging power level for each of energy storage devices 306a-306n. This parameter may also be the charging decision for each of energy storage devices 306a-306n. Accordingly, decided charging power for each of energy storage devices 306a-306n for time slot t, $P_i^{ch}(t)$, may be provided to power system 302 to enable system 302 to charge each of the energy storage devices 306a-306n in time slot t based on the decided charging power levels. This is indicated by the dashed line from controller 308 to power system 302.

Power system 302 may then charge each of energy storage devices 306a-306n, as indicated by the solid lines between power system 302 and energy storage devices 306a-306n.

According to the present disclosure, the determining of a charging parameter(s) for each of the energy storage devices 306a-306n, for example charging power levels, may be done in any suitable way.

In some embodiments, the determining of the parameter(s) may be based on historical data or information, which can include information from one or more previous time slots. As previously discussed, basing the parameter determination on historical information may mitigate or eliminate some or the issues that arise in practice due to the various types of delays, including communications delays, delays in obtaining charge or other state information, and/or charging dispatch delays.

In some embodiments, algorithms, techniques, and/or approaches according to the present disclosure may be performed or based on artificial intelligence (AI) algorithms, techniques, and/or approaches.

In some embodiments, the AI algorithms and techniques may include machine learning techniques. In an embodiment, online machine learning may be employed. Online machine learning is a technique of machine learning where data becomes available sequentially over time. The data is utilized to update a predictor for future data at each step in time (e.g. time slot). This approach of online machine learning may be contrasted to approaches that use batch learning wherein learning performed on an entire training data set. Online machine learning is sometimes useful where the data varies significantly over time, such as in power or energy pricing, commodity pricing, and stock markets. Further, online machine learning may be helpful when it is not practical or possible to train the agent over the entire data set.

In some embodiments, online optimization may be used. In some embodiments, some online machine learning techniques may in the form of, or based on, convex optimization. Online convex optimization is an optimization approach used in, for instance, real-time or near real-time system scheduling. It often involves optimization over multiple time slots with delayed information feedback. More specifically, the parameters in the optimization in the current time slots will not be known by the scheduler when the decision is made. In the online convex optimization approach, the original convex optimization problem is often recast as a quadratic optimization problem with historical information.

According to the present disclosure, online convex optimization may be used, wherein a problem of determining how to efficiently charge one or more energy storage devices may be translated into a per-time slot problem. In each time slot, a convex optimization problem may be solved to obtain a charging parameter(s) or decision for each of the energy storage devices. In an embodiment, the convex optimization problem in the form of a quadratic optimization problem.

Accordingly, in some embodiments, the determining of the charging parameter(s) and/or the generating of charging decisions may be performed or based on artificial intelligence (AI) algorithms or techniques. In an embodiment, determining a charging parameter for an energy storage device(s) may be based on solving a convex optimization problem, for example in the form of a quadratic optimization problem, wherein at least some historical data or information is used as input to the problem.

An example embodiment according to the present disclosure is now described in detail with reference to FIGS. 3 and 4. FIG. 3 was described above, and FIG. 4 is an example data flow diagram showing possible flows of messages, data, or other information between various components of a system according to the present disclosure.

During an initialization phase, which may be referred to as step 0, controller 308 may initialize a charging power $P_i^{ch}$ (1) for each energy storage device i (where i=a to n) in a first time slot. In addition, controller 308 may further initialize auxiliary variables $Q_i$ (1) for each energy storage device i in the first time slot and optionally store these variables in a memory of controller 308. This is shown as stage 402 in FIG. 4.

Auxiliary variables $Q_i(1)$ are some auxiliary variables that may be used in the present algorithm. In the initialization phase, the value of $Q_i(1)$ for each energy storage device i may be randomly set. In this embodiment, there is one auxiliary variable for each energy storage device. Then, as described below, in each time slot, the value of $Q_i(t)$ for each energy storage device i may be updated, for example by controller 308. Note that the auxiliary variable(s) $Q_i(t)$ may be in the optimization problem, described below, which may determine charging decisions for each of energy storage devices 306a-306n.

Figure 4:
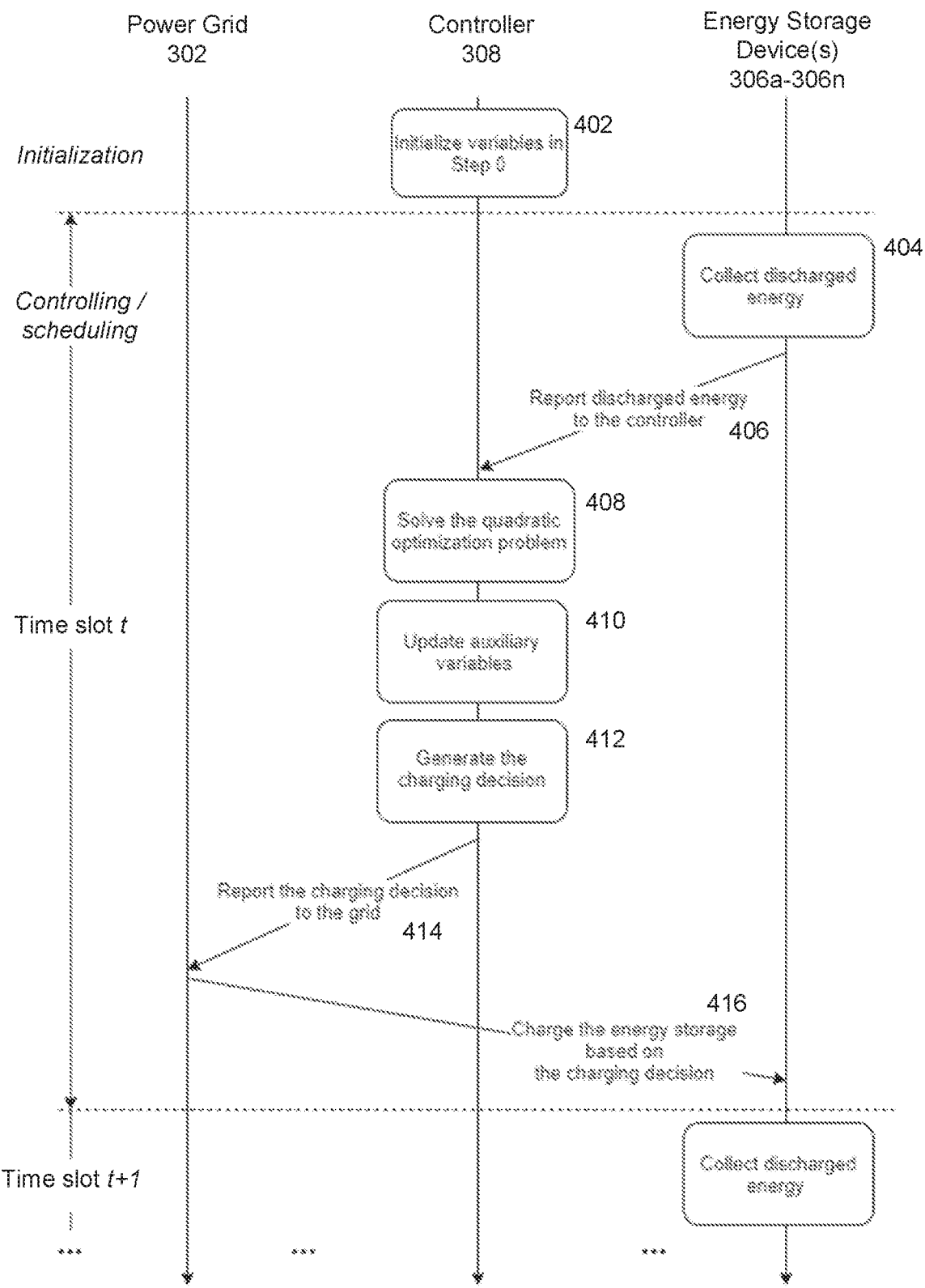
FIG. 4 is a data flow diagram showing possible flows of messages, data, or other information between various components of a system according to an embodiment.

After the initialization phase, the process enters charging decision generation phase in time slot t, as shown in FIG. 4. This may be considered a real-time or near real-time controlling or scheduling phase since the charging of energy storage devices 306a-306n may be controlled for each time slot in real-time or near real-time.

In a first part of the charging decision generation phase, which may be referred to as step 1, in each time slot, each of energy storage devices 306a-306n reports its discharged energy in the previous time slot, denoted by $U_i(t-1)$ to the controller 308. The value of the discharged energy may be 0 if no energy was discharged during the last time slot. Step 1 is represented as stages 404 and 406 in FIG. 4. Further, note that controller 308 may have the charging decision, and thus charging power, for the previous time slot for each of the energy storage devices 306a-306n since it was the controller 308 that made the charging decisions.

In a second part of the charging decision generation phase, which may be referred to as step 2, controller 308 generates a charging decision for each of energy storage devices 306a-306n. Step 2 is represented as stages 408, 410, and 412 in FIG. 4. As previously described, the determining of the charging parameter(s) and/or the generating of charging decisions may be performed or based on artificial intelligence (AI) algorithms or techniques. In this example embodiment, a charging parameter for each of energy storage devices 306a-306n is charging power level, meaning the power level at which the device will be charged during the current time slot. Further, in this embodiment, the determination of the charging parameter is based on solving a convex optimization problem, and more specifically solving a quadratic optimization problem. Once the problem is solved, controller 308 may then update the auxiliary variable(s) $Q_i(t)$ for each energy storage devices 306a-306n. Then, based on the solution to the optimization problem and the updated auxiliary variable(s) $Q_i$ (t), controller 308 may generate a charging decision for each of energy storage devices 306a-306n.

Step 2 may comprise 3 sub-steps, as now described.

In sub-step 2-1, controller 308 may solve a quadratic optimization problem, which may be parameterized by auxiliary variable(s) $Q_i(1)$ and the charging decisions in the previous time slot for energy storage devices 306a-306n. In this quadratic optimization problem, which is a quadratic minimization problem, an objective is to optimize the charging power of all energy storage devices 306a-306n to minimize a weighted sum of three terms. In this example embodiment, the optimization problem may be generally as follows:

$$\min_{\{P_i^{ch}(t)\}} \sum_i s P_i^{ch}(t) + V Q_i(t-1) P_i^{ch}(t) + \lambda (P_i^{ch}(t) - P_i^{ch}(t-1))^2$$

$$0 \leq P_i^{ch}(t) \leq P_i^{ch,max}$$

$$\text{s.t.} \sum_i P_i^{ch}(t) \leq P^{ch,max}$$

-continued where $s = 2\left(\sum_i P_i^{ch}(t-1) + P_L^{NT}(t-1) - P_{Sch}(t-1) - P_R(t-1)\right)$.

$P_i^{ch}(t)$ is a charging power in a current time slot for energy storage device i, which in this embodiment is the optimization variable. Accordingly, the problem minimizes the solution to the optimization problem by optimizing the values for a charging power to be used in time slot t to charge energy storage device i, namely $P_i^{ch}(t)$. The determined $P_i^{ch}(t)$ values in the solution are the determined charging parameters, here charging power, for each of the respective energy storage devices 306a-306n.

Further, $P_i^{ch}(t-1)$ is the charging power in the previous time slot for energy storage device i, which is constant when controller 308 solves the optimization problem. $Q_i(t-1)$ is the value of auxiliary variable in the previous time slot for energy storage device i. $P_i^{ch,max}$ is the maximum charging power at which energy storage i may be charged during a time slot. $P^{ch,max}$ is the maximum aggregate charging power for all energy storage devices 306a-306n. V, λ are hyperparameters that may be selected by the user, for example based on a training procedure. In machine learning, hyperparameters may be used to control a learning process.

Again, an objective in the quadratic minimization problem is to optimize the charging power of all energy storage devices 306a-306n to minimize a weighted sum of three terms. The first term $sP_i^{ch}(t)$ is related to the trend reflected by the system states in the previous time slot. The weight of the first term is related to the system states and charging decision in the previous time slot. The second term $VQ_i(t-1)P_i^{ch}(t)$ is related to the auxiliary variable, which is related to the state of charge in the energy storage. The weight of the second term is related to the value of auxiliary variable. The third term $\lambda(P_i^{ch}(t)-P_i^{ch}(t-1))^2$ is a quadratic regularization term, which is used to combat overfitting.

Further, there may be one or more constraints in the optimization problem. In this example, there are two constraints in the optimization problem, as shown above in the problem. One constraint restricts that each individual charging power is bounded. The other constraint implies that the sum of all of the charging powers for all energy storage devices 306a-306n is bounded.

Accordingly, in very general terms, in this example embodiment, the minimization problem finds a solution as follows. The problem includes variable s, which relates to (1) the overall amount of power that was required in time slot t-1, namely the amount of power that was required to the charge energy storage devices plus the amount of power that was required to satisfy the demand of the fixed load; minus (2) the amount of power that was available during time slot t-1 without paying a penalty to import additional power, namely the scheduled power ($P_{Sch}$) in time slot t-1 plus any additional power $P_R$ that was available during time slot t-1. The minimization optimization tries to minimize the difference for the current time slot t between the amount of power that will be needed (power to service fixed load, plus power for charging) and the amount of power that will be available (power scheduled, plus any additional power such as $P_R$). This may be minimized by at least in part adjusting the charging powers of the energy storage units for time slot t. In this way, the charging may done in an efficient and economical manner by charging when surplus power is available and not charging when doing so would incur a cost penalty.

In sub-step 2-2, controller 308 may update the auxiliary variable $Q_i(t)$ of each of energy storage devices 306a-306n based on the charging decision (e.g. $P_i^{ch}(t-1)$) and discharged energy for the given energy storage device 306a-306n in the previous time slot t-1. Specifically, the auxiliary variables may be updated based on the following equality:

$$Q_i(t)=\max\{Q_i(t-1)+\eta_i^c P_i^{ch}(t-1)\Delta t-U_i(t-1),0\}$$

$Q_i(t)$ is related to the state of charge of energy storage device i. The term $\eta_i^c P_i^{ch}(t-1)\Delta t$ is the charged energy for energy storage device i in the previous time slot t-1. $\eta_i^c$ is the charging efficiency for energy storage device i. The term $U_i(t-1)$ is the discharged energy for energy storage device i in the previous time slot.

In sub-step 2-3, the charging parameter(s) for each of energy storage devices 306a-306n may be modified depending on the circumstances. For instance, in this embodiment, the charging parameter is charging power. If, for energy storage device i, $Q_i(t)$ is less than a lower threshold value, controller 308 may forcibly increase the charging power $P_i^{ch}(t)$ for device i. For example, controller 308 may force the charging power $P_i^{ch}(t)$ for device i to be a maximum charging power for energy storage i. If, for energy storage device i, $Q_i(t)$ is larger than a upper threshold value, controller 308 may forcibly decrease the charging power $P_i^{ch}(t)$ for device i. For example, controller 308 may force the charging power $P_i^{ch}(t)$ for device i to be a minimum charging power for energy storage i. The minimum charging power may be zero. Otherwise, if $Q_i(t)$ falls within a range of the lower threshold value to the higher threshold value, the charging power $P_i^{ch}(t)$ for device i may be set as the solution to the optimization problem in step 2-1. In another embodiment, only one of the two upper and lower thresholds may be used. In some embodiments, sub-step 2-3 is optional, meaning that charging parameters or decisions may not be modified, for example based on lower or upper thresholds.

A purpose of these thresholds are related to the maximum and minimum energy level in an energy storage device, for instance absolute energy level or state of charge. The lower threshold is related to the minimum energy level in the energy storage device. If the energy level of the energy storage device is below the lower threshold, then this energy storage device may be charged at a higher charging power, such as a maximum charging power, for example to at least maintain the minimum energy level in the device. On the contrary, the upper threshold is related to the maximum energy level in the energy storage device. If the energy level of the energy storage device is above the upper threshold, then this energy storage device may be charged at a lower charging power, such as a minimum charging power. A minimum charging power may be set at zero, meaning the device is not charged. Lower and/or upper thresholds may be set by a grid operator depending on the operator wants to maintain the lowest and highest energy levels in the energy storage devices.

At the end of step 2, a charging decision for each energy storage device 306a-306n for time slot t is generated. The charging decision for each device 306a-306n may be the solution determined by the optimization problem in step 2-1, namely the charging parameter of charging power $P_i^{ch}(t)$ for each device i. Alternatively, a charging decision a device 306a-306n may be a modified or different charging parameter than the solution determined in step 2-1, for example a modified charging parameter as determined in step 2-3. Accordingly, in at least some embodiments, the charging decisions for at least some of energy storage devices 306a-306n may not be the solution determined by the optimization problem in step 2-1.

In a third part of the charging decision generation phase, which may be referred to as step 3, the charging decisions for each of energy storage devices 306a-306n may be provided to power system 302 to enable power system 302 to charge each energy storage devices 306a-306n in a current time slot t based on its respective charging decision. Step 3 is represented as stages 414 and 416 in FIG. 4.

Once step 3 has been completed, the cycle may be repeated again for time slot t+1, as shown in FIG. 4.

Figure 5:
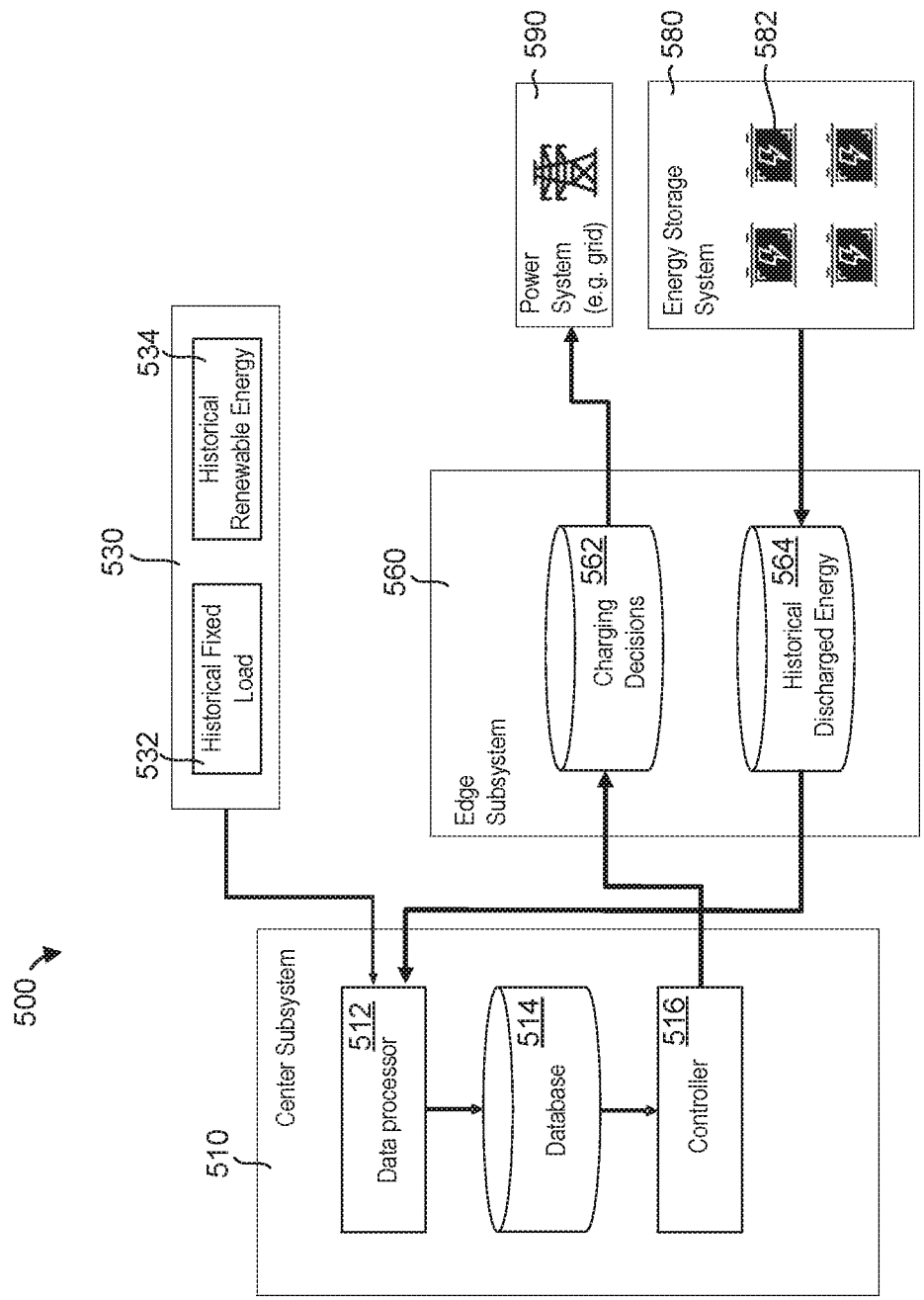
FIG. 5 is a block diagram of an example system for controlling the charging of energy storage device(s).

FIG. 5 is a block diagram of an example system 500 for controlling the charging of energy storage device(s) 582 according to the present disclosure. In this embodiment, energy storage device(s) 582 may be used in conjunction with a power system 590, for example a power grid. However, it is to be appreciated that in other embodiments, the present systems and methods, and other teachings according to the present disclosure, may be used in or with other systems and in other applications.

System 500 may be subdivided into several subsystems. In the embodiment of FIG. 5, system 500 generally comprises center subsystem 510, edge subsystem 560, and energy storage system 580. Energy storage system 580 may comprises the one or more energy storage device(s) 582. Center subsystem 510 and edge subsystem 560 may cooperate to provide for the control of charging energy storage device(s) 582.

Center subsystem 510 may generally comprise data processor 512, a database 514, and an energy storage controller 516. Center subsystem 510 may be tasked with performing operations such as performing operations and calculations for energy storage controller 516. These operations may include determining a charging parameter(s) and/or charging decision for each of energy storage devices 582. Further, center subsystem 510 may be tasked with processing, cleaning, and storing data. This data may include historical data, such as for example historical data 530, which may comprise historical fixed load data 532 and/or historical renewable energy data 534 (and/or intermittent power plant data). Additionally or alternatively, data may include one or more of the energy discharge information for some or all of energy storage devices 582 for a previous time slot, a charging decision for each of devices 582 for a previous time slot, a total fixed load power request of users of power system 590 in a previous time slot, and an amount of power received by power system 590 from intermittent power plant source(s) in the previous time slot. Data may be processed by data processor 512, and stored in database 514. Center subsystem 510 may comprise, for example, one or more electronic or other computer processors, computer memories, storage devices, and/or communications subsystems.

On the other hand, edge subsystem 560 may be tasked with, among other things, receiving, possibly storing in a database 562, and transmitting otherwise making available charging decisions from center subsystem 510 to power system 590 to enable system 590 to charge energy storage device(s) 582. Further, edge subsystem 560 may receive, possibly store in a database 564, and transmit or otherwise make available energy discharge information relating to energy storage device(s) 582 to center subsystem 510. Edge subsystem 560 may comprise, for example, one or more electronic or other computer processors, computer memories, storage devices, and/or communications subsystems.

The charging of energy storage device(s) 582 may be controlled in any suitable manner in accordance with the present disclosure.

Further, data or other information paths and signals, including those described herein and shown in the figures, may be different in other embodiments. For example, information and/or signal paths such as those represented by arrows in FIG. 5, may be communicated to or from parts or components other than those indicated by the arrows in FIG. 5.

Center subsystem 510 and edge subsystem 560 may be implemented on a single computing device, on separate computing devices, or on several computing devices. In an embodiment, center subsystem 510 and edge subsystem 560 may be implemented in a distributed computing system wherein operations are performed at each of two or more computing devices. Other options and configurations are possible.

In other embodiments, the functions, operations, and/or structures of center subsystem 510 and edge subsystem 560 may not be divided as between the two subsystems 510 and 560 as shown and described herein, including with reference to FIG. 5. For example, some or all of the functions, operations, and/or structures of edge subsystem 560 may be located or performed at center subsystem 510. Alternatively, some or all of the functions, operations, and/or structures of center subsystem 510 may be located or performed at edge subsystem 560. Alternatively, the system could have only a single subsystem, which has all of the functions, operations, and/or structures of both subsystems 510, 560 described herein. Other configurations are also possible.

Figure 6:
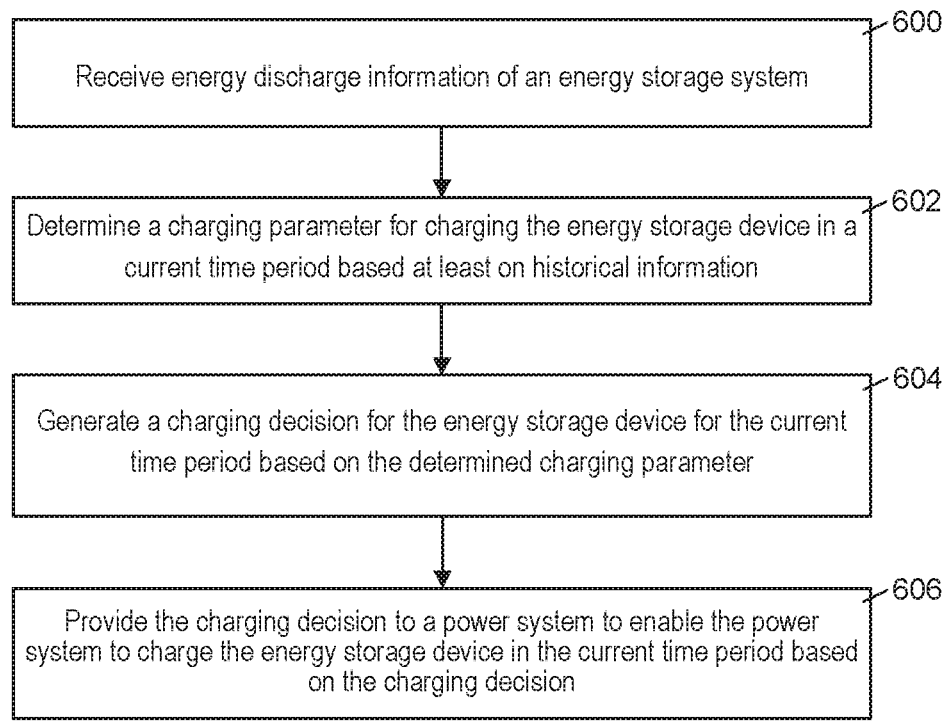
FIG. 6 is a process flow diagram showing operations or steps of an example computer-implemented method according to an example embodiment.

FIG. 6 is a process flow diagram showing operations or steps of an example computer-implemented method according to an example embodiment. The process begins at block 600, wherein energy discharge information of an energy storage system or device is received or otherwise obtained. The energy storage system comprises an energy storage device, and the energy discharge information may relate to an amount of energy discharged by the energy storage device in a previous time period.

The process then proceeds to block 602, where a charging parameter is determined for charging an energy storage device in a current time period based at least on historical information. The historical information may include one or more of the energy discharge information, a charging decision for the energy storage device for the previous time period, a total fixed load power request of the power system in the previous time period, and an amount of power received by the power system in the previous time period. The amount of power received by the power system in the previous time period may include an amount of power received by the power system from one or more intermittent power sources in the previous time period.

The process then proceeds to block 604, wherein a charging decision is generated for the energy storage device for the current time period based on the determined charging parameter.

The process then proceeds to block 606, where the charging decision is provided to a power system to enable the power system to charge the energy storage device in the current time period based on the charging decision.

The process according to FIG. 6 may be repeated, as already described herein.

Figure 7:
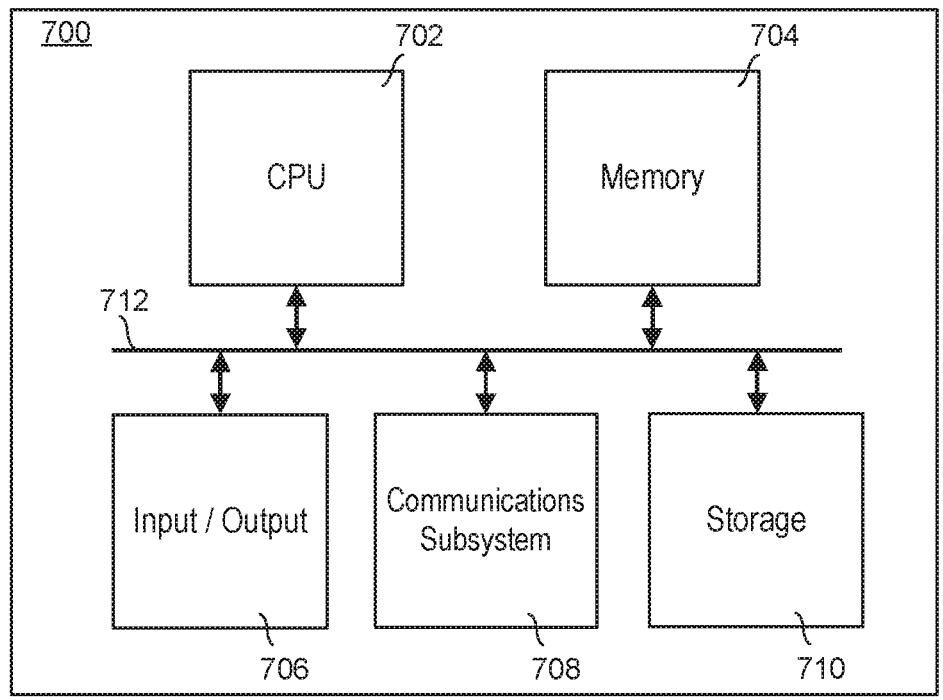
FIG. 7 is a block diagram of an example computerized device or system that may be used in implementing one or more aspects or components of an embodiment.

FIG. 7 is a block diagram of an example computerized device or system 700 that may be used in implementing one or more aspects or components of an embodiment according to the present disclosure. For example, system 700 may be used to implement a computing device or system, such as a controller, to be used with a device, system or method according to the present disclosure. Thus, one or more systems 700 may be configured to implement parts of system 300, system 500, or to implement system 500 in its entirety. This includes center subsystem 510 and/or edge subsystem 560.

Computerized system 700 may include one or more of a central processing unit (CPU) 702, memory 704, a mass storage device 710, an input/output (I/O) interface 706, and a communications subsystem 708. One or more of the components or subsystems of computerized system 700 may be interconnected by way of one or more buses 712 or in any other suitable manner.

The bus 712 may be one or more of any type of several bus architectures including a memory bus, storage bus, memory controller bus, peripheral bus, or the like. The CPU 702 may comprise any type of electronic data processor. The memory 704 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 710 may comprise any type of storage device configured to store data, programs, and other information and to make the data, programs, and other information accessible via the bus 712. In particular, device 710 may be configured to store database 514, 562, and/or 564 of system 500. The mass storage device 710 may comprise one or more of a solid state drive, hard disk drive, a magnetic disk drive, an optical disk drive, or the like. In some embodiments, data, programs, or other information may be stored remotely, for example in the cloud. Computerized system 700 may send or receive information to the remote storage in any suitable way, including via communications subsystem 708 over a network or other data communication medium.

The I/O interface 706 may provide interfaces for enabling wired and/or wireless communications between computerized system 700 and one or more other devices or systems, such as an electric vehicle charging system according to the present disclosure. Furthermore, additional or fewer interfaces may be utilized. For example, one or more serial interfaces such as Universal Serial Bus (USB) (not shown) may be provided.

Computerized system 700 may be used to configure, operate, control, monitor, sense, and/or adjust devices, systems, and/or methods according to the present disclosure.

A communications subsystem 708 may be provided for one or both of transmitting and receiving signals over any form or medium of digital data communication, including a communication network. Examples of communication networks include a local area network (LAN), a wide area network (WAN), an inter-network such as the Internet, and peer-to-peer networks such as ad hoc peer-to-peer networks. Communications subsystem 2008 may include any component or collection of components for enabling communications over one or more wired and wireless interfaces. These interfaces may include but are not limited to USB, Ethernet (e.g. IEEE 802.3), high-definition multimedia interface (HDMI), Firewire™ (e.g. IEEE 1374), Thunderbolt™, WiFi™ (e.g. IEEE 802.11), WiMAX (e.g. IEEE 802.16), Bluetooth™, or Near-field communications (NFC), as well as GPRS, UMTS, LTE, LTE-A, and dedicated short range communication (DSRC). Communication subsystem 708 may include one or more ports or other components (not shown) for one or more wired connections. Additionally or alternatively, communication subsystem 708 may include one or more transmitters, receivers, and/or antenna elements (none of which are shown).

Computerized system 700 of FIG. 7 is merely an example and is not meant to be limiting. Various embodiments may utilize some or all of the components shown or described. Some embodiments may use other components not shown or described but known to persons skilled in the art.

The concept of "near real-time" may be defined as operating using a pre-determined time interval or less.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not necessarily provided as to whether the embodiments described herein are implemented as a computer software, computer hardware, electronic hardware, or a combination thereof.

In at least some embodiments, one or more aspects or components may be implemented by one or more special-purpose computing devices. The special-purpose computing devices may be any suitable type of computing device, including desktop computers, portable computers, handheld computing devices, networking devices, or any other computing device that comprises hardwired and/or program logic to implement operations and features according to the present disclosure.

Embodiments of the disclosure may be represented as a computer program product stored in a machine-readable medium (also referred to as a computer-readable medium, a processor-readable medium, or a computer usable medium having a computer-readable program code embodied therein). The machine-readable medium may be any suitable tangible, non-transitory medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

In addition, the steps and the ordering of the steps of methods and data flows described and/or illustrated herein are not meant to be limiting. Methods and data flows comprising different steps, different number of steps, and/or different ordering of steps are also contemplated. Furthermore, although some steps are shown as being performed consecutively or concurrently, in other embodiments these steps may be performed concurrently or consecutively, respectively.

For simplicity and clarity of illustration, reference numerals may have been repeated among the figures to indicate corresponding or analogous elements. Numerous details have been set forth to provide an understanding of the embodiments described herein. The embodiments may be practiced without these details. In other instances, well-known methods, procedures, and components have not been described in detail to avoid obscuring the embodiments described.

The above-described embodiments are intended to be examples only. Alterations, modifications and variations may be effected to the particular embodiments by those of skill in the art without departing from the scope, which is defined solely by the claims appended hereto.

The invention claimed is:

1. A computer-implemented method comprising:
receiving energy discharge information of an energy storage system, the energy storage system comprising an energy storage device, the energy discharge information relating to an amount of energy discharged by the energy storage device in a previous time period;
determining a charging parameter for charging the energy storage device in a current time period, wherein the determining is based at least on historical information comprising the energy discharge information, a charging decision for the energy storage device for the previous time period, a total fixed load power request of the power system in the previous time period, and an amount of power received by the power system in the previous time period;
generating a charging decision for the energy storage device for the current time period, the charging decision being based on the determined charging parameter; and
providing the charging decision to a power system to enable the power system to charge the energy storage device in the current time period based on the charging decision.

2. The method according to claim 1, wherein the charging parameter is a charging power level.

3. The method according to claim 1, wherein the generating a charging decision for the energy storage device for the current time period further comprises:
determining if an energy level of the energy storage device is below a first threshold value; and
setting, in response to the energy level being below the first threshold value, the charging decision to indicate that the energy storage device is to be charged at a maximum charging power in the current time period.

4. The method according to claim 1, wherein the generating a charging decision for the energy storage device for the current time period further comprises:
determining if an energy level of the energy storage device is above a second threshold value; and
setting, in response to the energy level being above the second threshold value, the charging decision to indicate that the energy storage device is to be charged at a minimum charging power in the current time period.

5. The method according to claim 1, wherein the determining a charging parameter for the energy storage device for a current time period is based on solving an online optimization problem, and wherein at least some of the historical information are input parameters to the optimization problem.

6. The method according to claim 5, wherein an optimization function of the online optimization problem is represented at least partially by:

$$\min_{\{P_i^{ch}(t)\}} \sum_i s P_i^{ch}(t) + V Q_i(t-1) P_i^{ch}(t) + \lambda (P_i^{ch}(t) - P_i^{ch}(t-1))^2$$

$$0 \le P_i^{ch}(t) \le P_i^{ch,max}$$

$$\text{s.t.} \sum_i P_i^{ch}(t) \le P^{ch,max}$$

where $s = 2\left(\sum_i P_i^{ch}(t-1) + P_L^{NT}(t-1) - P_{Sch}(t-1) - P_R(t-1)\right)$;

$P_i^{ch}(t)$ is a charging power in the current time period for energy storage device i;
$P_i^{ch}(t-1)$ is a charging power in the previous time period for energy storage device i;
$Q_i(t-1)$ is a value of an auxiliary variable(s) in the previous time period;
$P_i^{ch,max}$ is a maximum charging power for energy storage device i;
$P^{ch,max}$ is a maximum charging power for all energy storage devices; and
V, λ are hyper-parameters.

7. The method according to claim 1, wherein the historical information comprising an amount of power received by the power system in the previous time period includes an amount of power received by the power system from one or more intermittent power sources in the previous time period.

8. The method according to claim 1, wherein the energy storage system comprises a plurality of energy storage devices, and wherein the energy discharge information relates to an amount of energy discharged by each of the plurality of energy storage devices in a previous time period, and wherein the determining, the generating, and the providing is performed in relation to each of the plurality of energy storage devices.

9. A computer-implemented system, comprising:
a processor; and
a memory operatively connected to the processor, and storing instructions for the processor,
wherein the processor is configured to perform operations comprising:
receive energy discharge information of an energy storage system, the energy storage system comprising an energy storage device, the energy discharge information relating to an amount of energy discharged by the energy storage device in a previous time period;
determine a charging parameter for charging the energy storage device in a current time period, wherein the determining is based at least on historical information comprising the energy discharge information, a charging decision for the energy storage device for the previous time period, a total fixed load power request of the power system in the previous time period, and an amount of power received by the power system in the previous time period;
generate a charging decision for the energy storage device for the current time period, the charging decision being based on the determined charging parameter; and provide the charging decision to a power system to enable the power system to charge the energy storage device in the current time period based on the charging decision.

10. The system according to claim 9, wherein the charging parameter is a charging power level.

11. The system according to claim 9, wherein in relation to the generating a charging decision, the processor is further configured to:
determine if an energy level of the energy storage device is below a first threshold value; and
set, in response to the energy level being below the first threshold value, the charging decision to indicate that the energy storage device is to be charged at a maximum charging power in the current time period.

12. The system according to claim 9, wherein in relation to the generating a charging decision, the processor is further configured to:
determine if an energy level of the energy storage device is above a second threshold value; and
set, in response to the energy level being above the second threshold value, the charging decision to indicate that the energy storage device is to be charged at a minimum charging power in the current time period.

13. The system according to claim 9, wherein the processor is further configured to determine the charging parameter for the energy storage device based on solving an online optimization problem, and wherein at least some of the historical information are input parameters to the optimization problem.

14. The system according to claim 13, wherein an optimization function of the online optimization problem is represented at least partially by:

$$\min_{\{P_i^{ch}(t)\}} \sum_i s P_i^{ch}(t) + V Q_i(t-1) P_i^{ch}(t) + \lambda (P_i^{ch}(t) - P_i^{ch}(t-1))^2$$

$$0 \leq P_i^{ch}(t) \leq P_i^{ch,max}$$

$$\text{s.t.} \sum_i P_i^{ch}(t) \leq P^{ch,max}$$

where $s = 2\left(\sum_i P_i^{ch}(t-1) + P_L^{NT}(t-1) - P_{Sch}(t-1) - P_R(t-1)\right)$;

$P_i^{ch}(t)$ is a charging power in the current time period for energy storage device i;
$P_i^{ch}(t-1)$ is a charging power in the previous time period for energy storage device i;
$Q_i(t-1)$ is a value of an auxiliary variable(s) in the previous time period;
$P_i^{ch,max}$ is a maximum charging power for energy storage device i;
$P^{ch,max}$ is a maximum charging power for all energy storage devices; and
V, λ are hyper-parameters.

15. The system according to claim 9, wherein the historical information comprising an amount of power received by the power system in the previous time period includes an amount of power received by the power system from one or more intermittent power sources in the previous time period.

16. A non-transitory computer-readable medium having computer-readable instructions stored thereon, the computer-readable instructions executable by a processor of one or more electronic devices to cause the performance of operations comprising:

receiving energy discharge information of an energy storage system, the energy storage system comprising an energy storage device, the energy discharge information relating to an amount of energy discharged by the energy storage device in a previous time period;
determining a charging parameter for charging the energy storage device in a current time period, wherein the determining is based at least on historical information comprising the energy discharge information, a charging decision for the energy storage device for the previous time period, a total fixed load power request of the power system in the previous time period, and an amount of power received by the power system in the previous time period;
generating a charging decision for the energy storage device for the current time period, the charging decision being based on the determined charging parameter; and
providing the charging decision to a power system to enable the power system to charge the energy storage device in the current time period based on the charging decision.

17. The non-transitory computer-readable medium according to claim 16, wherein the charging parameter is a charging power level.

18. The non-transitory computer-readable medium according to claim 16, wherein the generating a charging decision for the energy storage device for the current time period further comprises:
determining if an energy level of the energy storage device is below a first threshold value and/or determining if the energy level of the energy storage device is above a second threshold value, the second threshold value being higher than the first threshold value; and
setting, in response to the energy level being below the first threshold value, the charging decision to indicate that the energy storage device is to be charged at a maximum charging power in the current time period, and in response to the energy level being above the second threshold value, the charging decision to indicate that the energy storage device is to be charged at a minimum charging power in the current time period.

19. The non-transitory computer-readable medium according to claim 16, wherein the determining a charging parameter for the energy storage device for a current time period is based on solving an online optimization problem, and wherein at least some of the historical information are input parameters to the optimization problem.

20. The non-transitory computer-readable medium according to claim 19, wherein an optimization function of the online optimization problem is represented at least partially by:

$$\min_{\{P_i^{ch}(t)\}} \sum_i s P_i^{ch}(t) + V Q_i(t-1) P_i^{ch}(t) + \lambda (P_i^{ch}(t) - P_i^{ch}(t-1))^2$$

$$0 \leq P_i^{ch}(t) \leq P_i^{ch,max}$$

$$\text{s.t.} \sum_i P_i^{ch}(t) \leq P^{ch,max}$$

where $s = 2\left(\sum_i P_i^{ch}(t-1) + P_L^{NT}(t-1) - P_{Sch}(t-1) - P_R(t-1)\right)$;

$P_i^{ch}(t)$ is a charging power in the current time period for energy storage device i;

$P_i^{ch}(t-1)$ is a charging power in the previous time period for energy storage device i;

$Q_i(t-1)$ is a value of an auxiliary variable(s) in the previous time period;

$P_i^{ch,max}$ is a maximum charging power for energy storage device i;

$P^{ch,max}$ is a maximum charging power for all energy storage devices; and $V, \lambda$ are hyper-parameters.

* * * * *